United States Patent
Tsujiko et al.

(10) Patent No.: US 9,172,083 B2
(45) Date of Patent: Oct. 27, 2015

(54) LITHIUM ION SECONDARY BATTERY (75) Inventors: Akira Tsujiko, Toyota (JP); Yuko Matsumura, Toyota (JP)

(73) Assignee: Toyota Jidosha Kabushik Kaisha, Toyota-shi, Aichi (JP)

( * ) Notice: Subject to any disclaimer, the term of this patent is extended or adjusted under 35 U.S.C. 154(b) by 32 days.

(21) Appl. No.: 13/810,353

(22) PCT Filed: Jul. 23, 2010

(86) PCT No.: PCT/JP2010/062440
§ 371 (c)(1),
(2), (4) Date: Jan. 15, 2013

(87) PCT Pub. No.: WO2012/011189
PCT Pub. Date: Jan. 26, 2012

(65) Prior Publication Data
US 2013/0143125 A1    Jun. 6, 2013

(51) Int. Cl.
| | |
|---|---|
| *H01M 4/131* | (2010.01) |
| *H01M 4/136* | (2010.01) |
| *H01M 4/58* | (2010.01) |
| *H01M 4/62* | (2006.01) |
| *H01M 4/36* | (2006.01) |
| *H01M 4/587* | (2010.01) |
| *H01M 10/0525* | (2010.01) |
| *H01M 10/44* | (2006.01) |

(52) U.S. Cl.
CPC .............. *H01M 4/131* (2013.01); *H01M 4/136* (2013.01); *H01M 4/364* (2013.01); *H01M 4/587* (2013.01); *H01M 4/5825* (2013.01); *H01M 4/625* (2013.01); *H01M 10/0525* (2013.01); *H01M 10/44* (2013.01); *H01M 2220/20* (2013.01); *Y02E 60/122* (2013.01); *Y02T 10/7011* (2013.01)

(58) Field of Classification Search
USPC .............. 429/221, 223, 224, 231.1, 231.3
See application file for complete search history.

(56) References Cited

U.S. PATENT DOCUMENTS

| | | | |
|---|---|---|---|
| 2009/0239143 A1* | 9/2009 | Miyazaki et al. | ............. 429/188 |
| 2009/0267028 A1 | 10/2009 | Hoshiba | |
| 2010/0233058 A1 | 9/2010 | Sano et al. | |
| 2010/0233545 A1* | 9/2010 | Sano et al. | ................. 429/231.5 |

(Continued)

FOREIGN PATENT DOCUMENTS

| | | |
|---|---|---|
| CN | 101315975 | 12/2008 |
| CN | 101355165 | 1/2009 |
| EP | 2 541 566 | 1/2013 |

(Continued)

OTHER PUBLICATIONS

IPDL Machine Translation of the Detailed Description of JP 2003036889A (Feb. 2003).*

(Continued)

*Primary Examiner* — Gregg Cantelmo
(74) *Attorney, Agent, or Firm* — Finnegan, Henderson, Farabow, Garrett & Dunner, LLP (57) ABSTRACT

The lithium-ion secondary battery provided by the present invention comprises a positive electrode, a negative electrode, and a non-aqueous liquid electrolyte. The positive electrode comprises as a primary component of its positive electrode active material, a lithium-containing olivine compound. The positive electrode further comprises 2 to 20 parts by mass of an activated carbon relative to 100 parts by mass of the positive electrode active material.

14 Claims, 4 Drawing Sheets

(56) References Cited

U.S. PATENT DOCUMENTS

2010/0255377 A1  10/2010  Tsubata et al.
2012/0321913 A1  12/2012  Hua et al.

FOREIGN PATENT DOCUMENTS

| JP | 2001-110418 | | | 4/2001 |
| JP | 2001110418 | A | * | 4/2001 |
| JP | 2001-351688 | | | 12/2001 |
| JP | 2002-260634 | | | 9/2002 |
| JP | 2003-36889 | | | 2/2003 |
| JP | 2003034534 | A | * | 2/2003 |
| JP | 2003036889 | A | * | 2/2003 |
| JP | 2003-077458 | | | 3/2003 |
| JP | 2003-323884 | | | 11/2003 |
| JP | 2004-221523 | | | 8/2004 |
| JP | 2005-158719 | | | 6/2005 |
| JP | 2008-112595 | | | 5/2008 |
| JP | 2009252489 | A | * | 10/2009 |
| JP | 2010-218821 | | | 9/2010 |
| JP | 2013-520805 | | | 6/2013 |
| WO | WO 2009/063966 | | | 5/2009 |
| WO | WO 2009144600 | A2 | * | 12/2009 |

OTHER PUBLICATIONS

IPDL Machine Translation of the Detailed Description of JP 2001-110418A (Apr. 2001).*
IPDL Machine Translation of the Detailed Description of JP 2003-077458A (Mar. 2003).*
Liang-Shi et al. "Synthesis of Ultra-Fine LiFePO4/C and Its Electrochemical Performance"; Sohn International Symposium—Advanced Processing of Metals and Materials (vol. 3)—Aug. 27-31, 2006, pp. 229-238.*
Zubizarreta, L. et al., "Carbon materials for $H_2$ storage," Int'l Journal of Hydrogen Energy, vol. 34, (2009), pp. 4575-4581.
Hou, J. et al., "From Rice Bran to High Energy Density Supercapacitors: A New Route to Control Porous Structure of 3D Carbon," Scientific Reports, vol. 4, No. 7260, pp. 1-6; Dec. 1, 2014.

* cited by examiner

LITHIUM ION SECONDARY BATTERY

CROSS-REFERENCE TO RELATED APPLICATIONS

This application is a national phase application of International Application No. PCT/JP2010/062440, filed Jul. 23, 2010, the content of which is incorporated herein by reference.

TECHNICAL FIELD

The present invention relates to a lithium-ion secondary battery having excellent input and output properties.

BACKGROUND ART

A lithium-ion secondary battery comprises positive and negative electrodes capable of reversely storing and releasing lithium ions, and an electrolyte placed between the two electrodes; and charging and discharging are mediated by lithium ions in the electrolyte moving back and forth between the two electrodes. Because it is light-weighed and has a high energy density, it has been widely used as an electrical power source for various portable devices. There is an expectation for use also in the fields of such as hybrid vehicles and electric automobiles, etc., which require an electrical power source of large capacity, whereby there is a desire for improved properties. Technical literatures relating to lithium-ion secondary batteries include Patent Documents 1 to 4.

CITATION LIST

Patent Literatures

[Patent Document 1] Japanese Patent Application Publication No. 2003-323884
[Patent Document 2] Japanese Patent Application Publication No. 2001-110418
[Patent Document 3] Japanese Patent Application Publication No. 2008-112595
[Patent Document 4] Japanese Patent Application Publication No. 2002-260634

SUMMARY OF INVENTION

Technical Problem

In a general lithium-ion secondary battery, the input power density tends to decrease in a high SOC (State of Charge) range (when highly charged) and the output power density tends to decrease in a low SOC range (when poorly charged). Therefore, the actual SOC range where it can be charged and discharged at input and output power densities of prescribed values or upwards (hereinafter, this may be referred to as the effective SOC range) is likely to be much smaller than the 0% to 100% range. At a low temperature, the output power density in a low SOC range is likely to decrease more significantly, and the effective SOC range tends to be even smaller. Thus, especially in a secondary battery for use where it is subjected to repetitive cycles of input and output at high rates (cycles of rapid charging and discharging), it is desired to increase the effective SOC range by increasing the input and output properties.

As a method for increasing the input and output properties, it is general to connect the battery to a capacitor in parallel. However, according to such a method, the battery configuration or the system is likely to turn complex.

An objective of the present invention is to provide a lithium-ion secondary battery having greater input and output properties (especially, output properties at a low temperature).

Solution to Problem

The present invention provides a lithium-ion secondary battery comprising a positive electrode, a negative electrode, and a non-aqueous liquid electrolyte (electrolyte solution). The positive electrode comprises, as a primary component of its positive electrode active material, a lithium containing olivine compound. The positive electrode further comprises, relative to 100 parts by mass of the positive electrode active material, 2 to 20 parts by mass of an activated carbon. Since such a battery comprises an olivine compound as a positive electrode active material, it provides a stable voltage over a wider SOC range; and furthermore, since it comprises the prescribed amount of an activated carbon, the temperature dependence of the input and output powers is reduced, and excellent input and output properties may be brought about even at a low temperature. Thus, a battery of such a configuration may provide a wider SOC range (effective SOC range) where changing and discharging can be carried out at sufficient input and output power densities.

In a preferable embodiment; the lithium-ion secondary battery disclosed herein is characterized by that its corresponding evaluation battery which is configured to comprise the positive electrode without the activated carbon (i.e., a lithium-ion secondary battery having a configuration equivalent to that of the lithium-ion secondary battery according to the present invention except that it does not contain the activated carbon) satisfies the following property: when, at a temperature of 25° C., the evaluation battery is charged at a constant current rate of 0.5 C until the voltage across the two terminals reaches 4.1V (at which, its SOC is considered at 100%), followed by charging at the same constant voltage (4.1V) to a final current value of 0.02 C or smaller (typically until the charging current gradually drops to reach 0.02 C), followed by discharging at as constant current rate of 0.5 C until the voltage across the two terminals reaches 2.5 V, and then followed by discharging at the same constant voltage (2.5 V) to a final current value of 0.02 C (typically until the discharging current gradually drops to reach 0.02 C), it exhibits a voltage fluctuation range over a 15 to 95 SOC range, $\Delta V_{SOC15\text{-}95}$, of 0.5 V or smaller. In other words, the lithium-ion secondary battery disclosed herein preferably has a configuration such that an activated carbon is added to the positive electrode of an evaluation battery having such a property. A lithium-ion secondary battery having such a configuration, with addition of a suitable amount of an activated carbon, may have better input and output properties with a wider effective SOC range. It is noted that 1 C refers to an amount of current that allows charging in one hour to a full battery capacity (Ah) calculated from the theoretical capacity of its positive electrode. Additionally, the voltage fluctuation range, $\Delta V_{SOC15\text{-}95}$, is determined as the difference between the maximum value and the minimum value of the battery voltage over the 15% to 95% SOC range.

Figure 3:
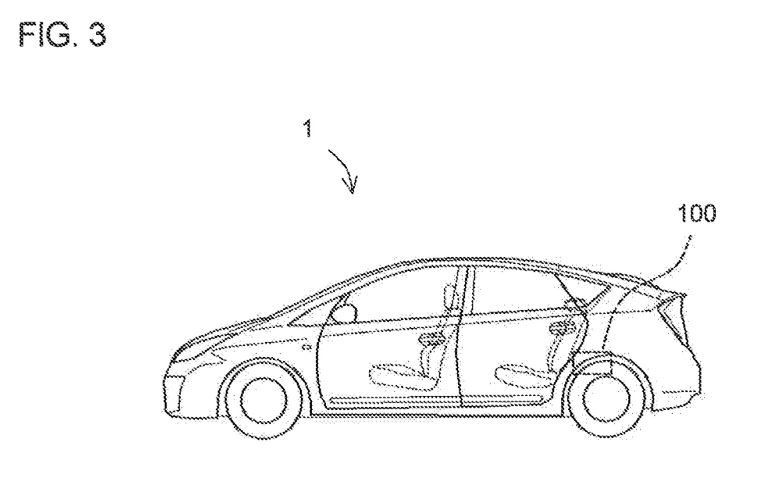
FIG. 3 shows a side view schematically illustrating a vehicle (an automobile) comprising a lithium-ion secondary battery according to the present invention.

As described above, the lithium-ion secondary battery disclosed herein has excellent input and output properties and has a wide SOC range where it can be used at high power levels; and therefore, it is preferable as a battery to be loaded on a vehicle. Thus, the present invention provides, as yet another aspect thereof, a vehicle 1 (FIG. 3) comprising a lithium-ion secondary battery disclosed herein. Especially preferable is an embodiment in which in the vehicle, such a lithium-ion secondary battery is used as a power source (typically, a power source of a hybrid vehicle or an electric vehicle).

DESCRIPTION OF EMBODIMENTS

Preferred embodiments of the present invention are described below. Matters necessary to practice this invention other than those specifically referred to in this description may be understood as design matters to a person of ordinary skills in the art based on the conventional art in the pertinent field. The present invention can be practiced based on the contents disclosed in this description and common technical knowledge in the subject field.

The positive electrode of the lithium-ion secondary battery disclosed herein comprises as a primary component of its positive electrode active material a lithium-containing compound that is capable of reversely storing and releasing lithium and has an olivine crystal structure. For instance, use of an olivine compound represented by general formula: $LiM^1PO_4$; is preferable. Here, $M^1$ is at least one kind selected from a group consisting of Fe, Co, Mn, and Ni. Examples of such an olivine compound include $LiFePO_4$, a compound having a composition where the Fe thereof is partially substituted with Mn (typically representable by $LiFe_xMa_{1-x}PO_4$) or with Co (typically representable by $LiFe_xCo_{1-x}PO_4$), a compound having a composition whew the Fe in $LiFePO_4$ is entirely substituted with Mn ($LiMnPO_4$) or with Ni ($LiNiPO_4$), and so on. An especially preferable example is $LiFePO_4$. Of these olivine compounds, one kind can be used solely, or two or more kinds can be used in combination. Here, the primary component of its positive electrode active material refers to a positive electrode active material that occupies the largest proportion in all the positive electrode active material. In an embodiment, the amount of the olivine compound is preferably 50% by mass or greater of all the positive electrode active material. Of the lithium-ion secondary battery in such an embodiment, the effective SOC range, which is described later, may be 1.10 fold of the corresponding evaluation battery or greater. It is more preferable that the total amount of the olivine compound contained in the positive electrode active material is 80% by mass or greater.

In addition to the olivine compound, the positive electrode active material may further comprise as an optional component a lithium-containing compound having a different crystal structure (which may be referred to as a non-olivine compound) such as of layered rock salt structure or spinel structure, etc. Examples of a layered rock salt lithium-containing compound include compounds represented by general formula: $LiM^2O_2$. Here, $M^2$ is at least one kind selected from a group consisting of Co, Ni, and Mn. Examples of such a layered rock salt compound include $LiNi_xMn_{1-x}O_2$, $LiNi_{1-x-y}Mn_xCo_yO_2$, and so on. Examples of a spinel lithium-containing compound include compounds represented by general formula: $LiM^3{}_2O_4$. Here, $M^3$ is at least one kind selected from a group consisting of Mn, Co, Ni, Cr, and Fe. Examples of such a spinel compound include $LiM^3{}_xMn_{2-x}O_2$ and so on. Especially preferable examples of a non-olivine compound include $LiNiO_2$, $LiCoO_2$, $LiMnO_4 LiCo_{1/3}Ni_{1/3}Mn_{1/3}O_2$, $LiNi_{0.5}Mn_{1.5}O_4$ and so on. Of these non-olivine compounds, one can be used solely, or two or more kinds can be used in combination. When such a non-divine compound is used, its amount to be used can be suitably selected such that the $\Delta V_{SOC15-95}$ described above tins out to be 0.5 V or smaller. For example, the total amount of the non-olivine-based compound contained in the positive electrode active material is preferably 50% by mass or smaller, or more preferably 20% by mass or smaller. When the amount of the optional component is exceedingly large, $\Delta V_{SOC15-95}$ tends to become large; and even with addition of a prescribed amount of an activated carbon, it may not effect sufficient increases in the input and output properties. The positive electrode active material may be essentially five of these non-olivine compounds.

In addition to the positive electrode active material, the positive electrode further comprises an activated carbon. As the activated carbon, can be preferably used a carbon in a desired form (average particle diameter, specific surface area, pore volume, etc.) prepared by carbonizing and activating a raw material such as resin, coconut shells, coal, coke, pitch, etc., followed by a pulverization process, etc. The carbonization and activation of the raw material can be carried out by a conventionally known method. The carbonization and activation can be carried out at the same time or in steps.

The activated carbon has an average particle diameter of preferably about 0.1 μm to 50 μm, more preferably about 2 μm to 50 μm, or even more preferably about 2 μm to 20 μm. When the average diameter is excessively large, the conductivity in the electrode may tend to become lower. When the average diameter is too small, the specific surface area may tend to be small, and it may be difficult to obtain a sufficient capacitance. In this description, the average particle diameter refers to a volume mean diameter determined by measurement of particle size distribution in accordance with the laser diffraction and scattering method.

The activated carbon preferably has a specific surface area of about 100 $m^2$/g to 2500 $m^2$/g. When the specific surface area is excessively large, the activity may become too high, thereby increasing side reactions in the positive electrode. When the specific surface area is too small, it may be difficult to obtain a sufficient capacitance. As the specific surface area, a value measured by the method generally called nitrogen adsorption method or BET method is used.

The activated carbon preferably has a pore volume of about 0.2 mL/g to 2.0 mL/g. When the pore volume is too small, intercalation of ions into the pore may be less likely to be sufficient to generate capacitance. When the pore volume is too large, the amount of ions to intercalate into the pore may turn out excessively large. Such excessive ions may make it difficult to generate capacitance in a short time.

The amount of the activated carbon contained in the positive electrode is, relative to 100 parts by mass of the positive electrode active material, 2 to 20 parts by mass (preferably 5 to 15 parts by mass). Such a lithium-ion secondary battery may exhibit a relative output power ratio at 50% SOC described later of 1.10 fold or greater. When the amount of the activated carbon added is too small, a sufficient increase in the output power may not be effected. When the amount of the activated carbon is excessively large, it may lead to reduced durability or a decrease in the energy density.

In an embodiment, the lithium-ion secondary battery disclosed herein preferably has a voltage fluctuation range, $\Delta V_{SOC15-95}$, of 0.5 V or smaller (more preferably 0.3 V or smaller). Such a lithium-ion secondary battery may be such that the width of the SOC range (effective SOC range) where the relative input and output power ratios determined by the method described below are both 0.85 or greater is 1.10 fold of the corresponding evaluation battery or greater. As described earlier, an evaluation battery is constituted so that the positive electrode active material layer does not contain an activated carbon; and when the lithium-ion secondary battery disclosed herein is subjected to measurement, an evaluation battery corresponding thereto has the same configuration as that of the subject battery except that it does not contain the activated carbon. The effective SOC range of an evaluation battery can be figured out by subjecting the evaluation battery to measurement and determining the relative input and output power ratios in the same manner. In other words, when the object for measurement is a battery with a positive electrode active material layer free of an activated carbon, the said battery and its evaluation battery have an identical configuration.

[Method for Measuring Relative Input Power Ratio]

An evaluation battery corresponding to the lithium-ion secondary battery to be subjected to measurement is obtained. This is adjusted to an initial SOC of 50%, and at −10° C., is charged at power values (e.g., 0.1 W, 0.3 W, 1 W, 5 W, ..., 190 W, etc.) varied in a prescribed range (e.g., 0.1 W to 190 W). At the same time, at each power value, the charging time (seconds) required until the voltage across the two terminals reaches 4.1 V is measured. The power value (Y-axis) is plotted against the charging time (X-axis) and the power value at the charging time of 5 seconds is read. This is converted to an input power density at 50% SOC, $D_{in[0]}$ (amount of input power per unit mass) (W/kg), and the converted value is used as the reference input power value.

With respect to the subject battery, at varied initial SOC values, following the same procedures, the input power densities at the respective initial SOC values are measured and the power ratios relative to the reference input power value ($D_{in[C]}/D_{in[0]}$) are determined as the relative input power ratios.

[Method for Measuring Relative Output Power Ratio]

At −10° C., an evaluation battery adjusted to an initial SOC of 50% is discharged at power values (e.g., 0.1 W 0.3 W, 1 W, 5 W, ..., 190 W, etc.) varied in a prescribed range (e.g., 0.1 W to 190 W). At the same time, at each power value, the discharging time (seconds) required until the voltage across the two terminals reaches 2.5 V is measured. The power value (Y-axis) is plotted against the discharging time (X-axis) and the power value at the discharging time of 5 seconds is read. This is converted to an output power density at 50% SOC, $D_{out[0]}$ (amount of output power per unit mass) (W/kg), and the converted value is used as the reference output power value.

With respect to the subject battery, at varied initial SOC values, following the same procedures, the output power densities $D_{out[C]}$ (wherein [C] indicates the amount of activated carbon (parts)) at the respective initial SOC values are measured and the power ratios relative to the reference output power value ($D_{out[C]}/D_{out[0]}$) are determined as the relative output power ratios.

The relative output power ratio at 50% SOC described earlier refers to a relative output power ratio when the initial SOC is at 50% ($D_{out[50]}/D_{out[0]}$). Therefore, when the relative output power ratio at 50% SOC is 1.10 or greater, it means that the output power of the subject battery at 50% SOC is higher by % than the output power of the evaluation battery at 50% SOC (i.e., that the output power has been increased by 10% or more with the added activated carbon).

Next, in reference to drawings, the lithium-ion secondary battery to which the art disclosed herein is applied is described further in detail with an example of a lithium-ion secondary battery 100 (FIG. 1) in an embodiment such that an electrode body and a non-aqueous liquid electrolyte are placed in a square battery case. However, the applicability of the present invention is not to be limited to such an embodiment. In other words, the shape of the lithium-ion secondary battery disclosed herein is not particularly limited, and the materials, shapes, sizes, etc., of components such as the battery case, electrode body, etc., can be suitably selected in accordance with its intended use and capacity. For example, the battery case may have a cubic, flattened, cylindrical, or other shape. In the drawings below, all members and sites providing the same effect are indicated by the same reference numerals, and redundant descriptions may be omitted or abbreviated. Moreover, the dimensional relationships (of length, width, thickness, etc.) in each drawing do not represent actual dimensional relationships.

Figure 1:
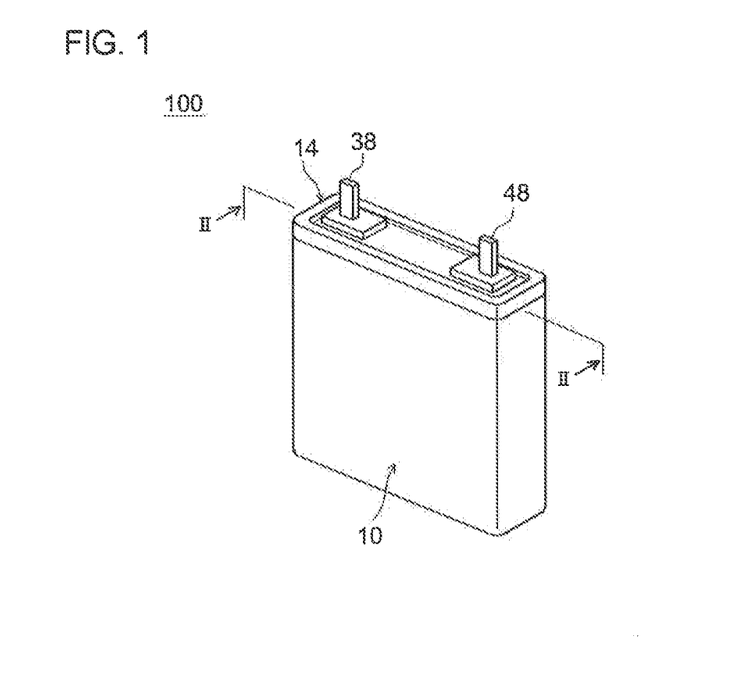
FIG. 1 shows a perspective view schematically illustrating an embodiment of the lithium-ion secondary battery according to the present invention.
Figure 2:
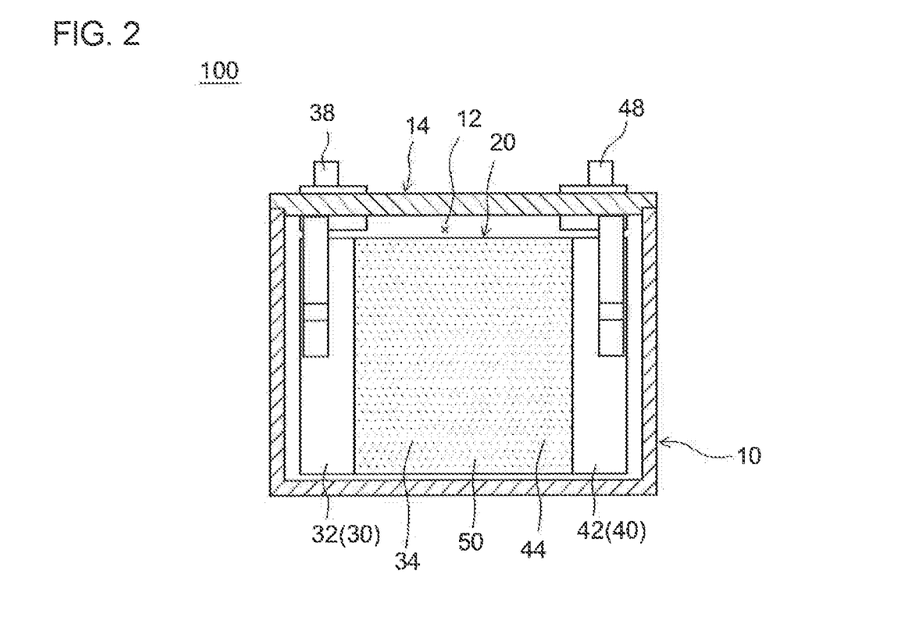
FIG. 2 shows a cross-sectional view taken along the line II-II in FIG. 1.

As shown in FIGS. 1 and 2, the lithium-ion secondary battery 100 according to the present embodiment can be constructed by placing a wound electrode body 20 along with a liquid electrolyte not shown in the drawing via an opening 12 into a flat box-shaped battery case 10 suitable for the shape of the electrode body 20, and closing the opening 12 of the case 10 with a lid 14. The lid 14 has a positive terminal 38 and a negative terminal 48 for connection to the outside, with the terminals partially extending out from the surface of the lid 14.

The electrode body 20 is formed into a flattened shape by overlaying and rolling up a positive electrode sheet 30 in which a positive electrode active material layer 34 is formed on the surface of a long sheet of a positive current collector 32 and a negative electrode sheet 40 in which a negative electrode active material layer 44 is formed on a long sheet of a negative current collector 42 along with two long sheets of separators 50, and laterally compressing the resulting wound body. The separator 50 is impregnated in advance with the non-aqueous liquid electrolyte. This allows formation of ion-conductive paths (conductive pathways) between the electrodes.

The positive electrode sheet 30 is formed to expose the positive current collector 32 on an edge along the sheet length direction. In other words, the positive electrode active material layer 34 is not provided or has been removed after formed at the edge. Similarly, the negative electrode sheet 40 to be wound is formed to expose the negative current collector 42 on an edge along the sheet length direction. The positive terminal 38 is joined to the exposed edge of the positive current collector 32 and the negative terminal 48 is joined to the exposed edge of the negative current collector 42, respectively, to form electrical connections with the positive electrode sheet 30 and the negative electrode sheet 40 of the flattened wound electrode body 20. The positive and negative terminals 38 and 48 can be joined to their respective positive and negative current collectors 32 and 42, for example, by ultrasonic welding, resistance welding, and so on.

The positive electrode active material layer 34 can be preferably formed, for instance, by applying to the positive current collector 32 a paste or shiny composition (positive electrode material mixture) obtained by dispersing in a suitable solvent the positive electrode active material along with a conductive material, a binder, etc., as necessary, and by drying the composition.

As the conductive material, can be preferably used conductive materials such as carbon powder, carbon fibers, and so on. As the carbon powder, various kinds of carbon black such as acetylene black, furnace black, Ketjen black, graphite powder and the like are preferable. One kind of conductive material can be used solely, or two or more kinds can be used in combination. The amount of the conductive material contained in the positive electrode active material layer may be suitably selected in accordance with the kind and amount of the positive electrode active material As the binder, a suitable one can be selected for use from, for example, water-soluble polymers that dissolve in water, water-dispersible polymers, polymers that dissolve in a non-aqueous solvent (organic solvent), and so on. One type of material can be used solely, or two or more types can be used in combination.

Examples of water-soluble polymers include carboxymethylcellulose (CMC), methylcellulose (MC), cellulose acetate phthalate (CAP), hydroxypropyl methylcellulose (SMC)), hydroxypropyl methylcellulose phthalate (HPMCP) and polyvinyl alcohols (PVA), and the like.

Examples of water-dispersible polymers include fluorine-based resins such as polytetrafluoroethylene (FIFE), tetrafluoroethylene-perfluoro-alkyl vinyl ether copolymer (PEA), tetrafluoroethylene-hexafluoropropylene copolymer (FEP), ethylene-tetrafluoro-ethylene copolymer (ETFE), and the like; and rubbers such as vinyl acetate polymer, styrene butadiene block copolymer (SBR), acrylic acid-modified SBR resin (SBR-based latex), gum arabic, and the like.

Examples of polymers that dissolve in a non-aqueous solvent (organic solvent) include poly(vinylidene fluoride) (PVDF), poly(vinylidene chloride) (PVDC), polyethylene oxide (PEO), polypropylene oxide (PPO), and polyethylene oxide-polypropylene oxide copolymer (PEO-PPO), and the like.

The amount of the binder to be added can be suitably selected in accordance with the type and amount of the positive electrode active material.

As the positive current collector 32, can be preferably used a conductive material formed of a metal having good conductivity. For example, can be used aluminum or an alloy containing aluminum as the primary component. The shape of the positive current collector 32 is not particularly limited as it may vary in accordance with the shape, etc, of the lithium-ion secondary battery and it may have a variety of shapes such as of a rod, plate, sheet, foil, mesh, and so on. In the present embodiment, an aluminum sheet is used as the positive current collector 32 and can be preferably used in a lithium-ion secondary battery 100 comprising a wound electrode body 20. In such an embodiment, for example, an aluminum sheet having a thickness of about 10 µm to 30 µm can be preferably used.

The negative electrode active material layer 44 can be formed, for instance, by applying to the negative current collector 42 a paste or slurry composition (negative electrode material mixture) obtained by dispersing in a suitable solvent a negative electrode active material along with a binder, etc., and drying the composition.

As the negative electrode active material, one, two or more kinds of substances conventionally used in lithium-ion secondary batteries can be used without particular limitation. Examples of a suitable negative electrode active material include carbon particles. Preferably used is a particulate carbon material (carbon particles) at least partly comprising a graphite structure (layered structure). So-called black lead (graphite), poorly-gaphitizable carbons (hard carbons), highly-gaphitizable carbons (soft carbons), and any carbon materials combining these structures can be suitably used. Of these, in particular, can be preferably used graphite particles such as natural graphite and the like. Graphite particles have excellent conductivity because they can suitably store lithium ions as the charge carriers. Moreover, they can serve as a negative electrode active material suitable for rapid charging and discharging (e.g., high output discharging) because they have a small particle diameter, and a large surface area per unit volume.

The amount of the negative electrode active material contained in the negative electrode active material layer is not particularly limited, and it can be preferably about 90% by mass to 99% by mass, or more preferably about 95% by mass to 99% by mass.

As the binder, of those listed earlier for the positive electrode, one kind can be used solely, or two or more kinds can be used in combination. The amount of the binder to be added can be suitably selected in accordance with the kind and amount of the negative electrode active material.

As the negative current collector 42, can be preferably used a conductive material formed of a metal having good conductivity. For instance, copper or an alloy containing copper as the primary component can be used. The shape of the negative current collector 42 is not particularly limited as it may vary in accordance with the shape, etc., of the lithium-ion secondary battery; and it may have a variety of shapes such as a rod, plate, sheet, foil, mesh, and so on. In the present embodiment, a copper sheet is used as the negative current collector 42 and can be preferably used in a lithium-ion secondary battery 100 comprising a wound electrode body 20. In such an embodiment, for example, a copper sheet having a thickness of about 5 µm to 30 µm can be preferably used.

As the separator 50, which is layered and used with the positive electrode sheet 30 and the negative electrode sheet 40, various separators used in general lithium-ion secondary batteries can be used without particular limitation. For example, can be suitably used a porous film formed of a polyolefin-based resin such as polyethylene, polypropylene, and so on. The film may be a single layer or multi-layered. Can be also used a separator obtained by applying to such a resin film an inorganic filler layer containing one, two or more kinds of particulate ceramic such as titania (titanium dioxide; $TiO_2$), alumina, silica, magnesia, zirconia, zinc oxide, iron oxide, ceria, yttria, and so on. The thickness of the separator can be suitably selected.

The non-aqueous liquid electrolyte to impregnate the separator 50 can be prepared by dissolving a suitable electrolyte in a non-aqueous solvent. As the electrolyte, can be used any electrolyte used in general lithium-ion secondary batteries without particular limitation. For example, can be used one, two or more kinds selected from $LiPF_6$, $LiBF_4$, $LiClO_4$, $LiAsF_6$, $LiCF_3SO_3$, $LiC_4F_9SO_3$, $LiN(CF_3SO_2)_2$, LiC ($CF_3SO_2$)$_3$, LiI, and so on. The concentration of the electrolyte in the liquid electrolyte is not particularly limited, and it can be, for example, at the same levels as the concentrations of electrolyte used in conventional lithium-ion secondary batteries. To the liquid electrolyte, various additives, etc., may be added in addition to the electrolyte.

As the organic solvent (non-aqueous solvent) used in the non-aqueous liquid electrolyte, can be preferably used a non-protic solvent such as carbonates, esters, ethers, nitriles, sulfones, lactones, and so on. For example, of organic solvents generally used in lithium-ion secondary batteries such as ethylene carbonate (EC), propylene carbonate (PC), diethyl carbonate (DEC), dimethyl carbonate (DMC), ethyl methyl carbonate (EMC), 1,2-dimethoxyethane (DME), 1,2-diethoxyethane, tetrahydrofuran, 2-methyltetrahydrofuran, dioxane, 1,3-dioxolane, diethylene glycol dimethyl ether, ethylene glycol dimethyl ether, acetonitrile, propionitrile, nitromethane, N,N-dimethylformamide, dimethyl sulfoxides, sulfolane, γ-butyrolactone (BL), and so on, one kind can be used solely, or two or more kinds can be used in combination.

Several embodiments relevant to the present invention are described below although this is not to limit the present invention to these embodiments.

Example 1

Were mixed 35.0 g of carbon black, 35.0 g of PVDF (700 g of a 5% NMP solution), and 15.5 g of an activated carbon (average particle diameter of 10 μm, pore volume of 0.8 mL/g, specific surface area of 1800 m$^2$/g), and 700 g of $LiFePO_4$ was further added and mixed. After this, 400 g of NMP was added and mixed overnight to prepared a positive electrode material mixture as a paste. This positive electrode material mixture was applied to a first face of a 15 μm thick aluminum sheet so as to obtain a coating amount of 12.5 mg/cm$^2$. After dried, the resultant was pressed with a 3 ton roll press machine to obtain a positive electrode sheet. The $LiFePO_4$ and the carbon black were used after vacuum-dried at 120° C. for 10 hours.

Were mixed 600 g of synthetic graphite and 30.0 g of PVDF (600 g of a 5% NMP solution). This was further mixed with gradual addition of NMP. This was defoamed in a vacuum to prepare a negative electrode material mixture as a paste. This negative electrode material mixture was applied to each face of a 10 μm thick copper sheet so as to obtain a coating amount of 5.0 mg/cm$^2$. After dried, the resultant was pressed with a 3 ton roll press machine to obtain a negative electrode sheet.

A single negative electrode sheet (7 cm by 5 cm) was placed between two sheets of separator impregnated with a 1.0 M $LiPF_6$ solution (EC:EMC=3:7 (volume ratio)), and the resultant was further placed between two positive electrode sheets (6 cm by 4 cm). With this, was fabricated a laminate cell battery.

Example 2

Except that 630 g of $LiFePO_4$ and 70 g of $LiNiO_2$ were used in place of 700 g of $LiFePO_4$, in the same manner as Example 1, was fabricated a laminate cell battery of this example.

Example 3

Except that 560 g of $LiFePO_4$ and 140 g of $LiNiO_2$ were used in place of 700 g of $LiFePO_4$, in the same manner as Example 1, was fabricated a laminate cell battery of this example.

Example 4

Except that 350 g of $LiFePO_4$ and 350 g of $LiNiO_2$ were used in place of 700 g of $LiFePO_4$, in the same manner as Example 1, was fabricated a laminate cell battery of this example.

Example 5

Except that 140 g of $LiFePO_4$ and 560 g of $LiNiO_2$ were used in place of 700 g of $LiFePO_4$, in the same manner as Example 1, was fabricated a laminate cell battery of this example.

Example 6

Except that 700 g of $LiNiO_2$ was used in place of 700 g of $LiFePO_4$, in the same manner as Example 1, was fabricated a laminate cell battery of this example.

Example 7

Was fabricated an evaluation battery corresponding to Example 1 (having the same configuration as Example 1 except that activated carbon was excluded from the positive electrode active material layer).

Example 8

Was fabricated an evaluation battery corresponding to Example 2.

Example 9

Was fabricated an evaluation battery corresponding to Example 3.

Example 10

Was fabricated an evaluation battery corresponding to Example 4.

Example 11

Was fabricated an evaluation battery corresponding to Example 5.

Example 12

Was fabricated an evaluation battery corresponding to Example 6.

Example 13

Except that the amount of the activated carbon added was 7 g, in the same manner as Example 1, was fabricated a laminate cell battery of this example.

Example 14

Except that the amount of the activated carbon added was 35 g, in the same manner as Example 1, was fabricated a laminate cell battery of this example.

Example 15

Except that the amount of the activated carbon added was 70 g, in the same manner as Example 1, was fabricated a laminate cell battery of this example.

Example 16

Except that the amount of the activated carbon added was 140 g, in the same manner as Example 1, was fabricated a laminate cell battery of this example.

Example 17

Except that the amount of the activated carbon added was 210 g, in the same manner as Example 1, was fabricated a laminate cell battery of this example.

[Aging Process]

At 25° C., each battery was charged to 4.1 V at a constant current (CC) rate of 0.33 C (required about 3 hours) and then charged at the same constant voltage (4.1 V). Here, a current value of 0.02 C or below was set as the condition for terminating the charging at the constant voltage. After this, it was CC-discharged at a rate of 0.33 C until the voltage dropped to 2.5 V (required about 3 hours) and then discharged at the same constant voltage (2.5 V). Here, a current value of 0.02 C or below was set as the condition for terminating the discharging at the constant voltage. Under the conditions described above, 3 cycles of charging and discharging were conducted.

[Measurement of Voltage Fluctuation Range $\Delta V_{SOC15\text{-}95}$]

At 25° C., each of the respective evaluation batteries in Examples 7 to 12 was charged at a rate of 0.5 C until the voltage across the two terminals reached 4.1 V and further charged at the same voltage to a final current value of 0.02 C or below, and then discharged at a rate of 0.5 C until the voltage reached 2.5 V and further discharged at the same voltage to a final current value of 0.02 C or below while monitoring the voltage change relative to the SOC level. The voltage fluctuation range over the 15% to 95% SOC range, $\Delta V_{SOC15\text{-}95}$, was determined as the difference between the maximum voltage and the minimum voltage in the 15% to 95% SOC range.

[Measurement of Relative Input and Output Power Ratios]

Figure 4:
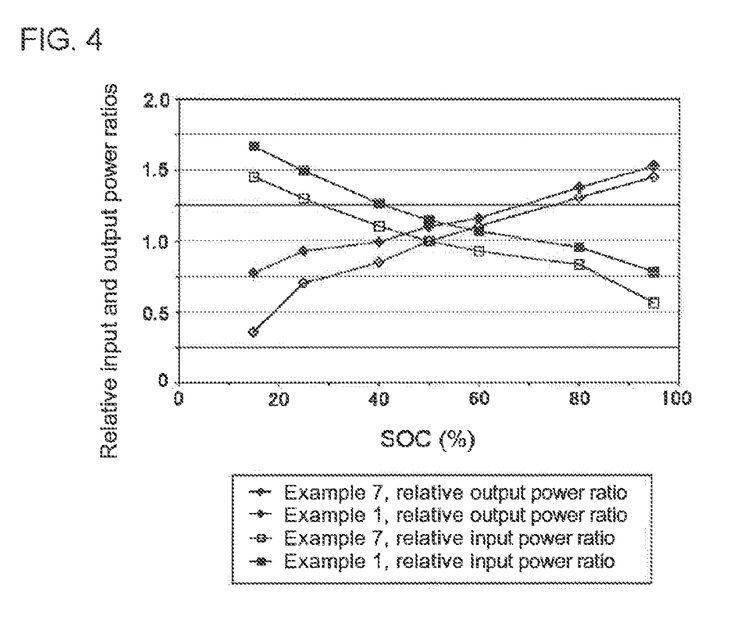
FIG. 4 shows a graph illustrating changes in the relative ratios of input and output powers over the 15 to 95% SOC range with respect to the battery according to Example 1 and the battery according to Example 7.

Based on the method for measuring relative input and output power ratios described earlier, with respect to the batteries of Examples 1 to 6 and the corresponding evaluation batteries of Examples 7 to 12, the 5 second input power densities and the 5 second output power densities at the initial SOC levels of 95%, 80%, 60%, 50%, 40%, 25%, and 15% were determined respectively, and the relative input and output power ratios were calculated, respectively. In the measurement at each initial SOC level, the current value was varied in the range from 0.1 W to 190 W. FIG. 4 shows a plot of the relative input and output power ratios against the SOC with respect to the battery of Example 1 and the battery of Example 7 (evaluation battery corresponding to Example 1).

[Fold Increase in Effective SOC Range]

Figure 5:
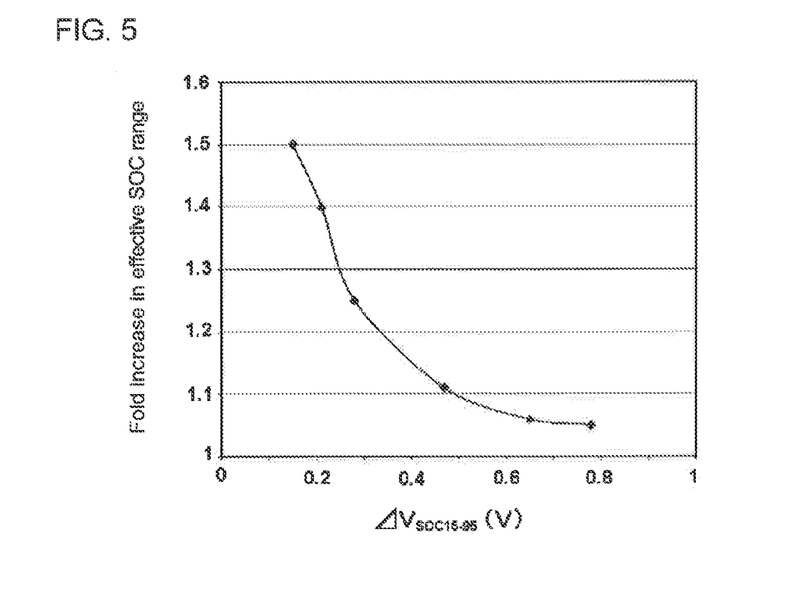
FIG. 5 shows a graph plotting the fold increases in the effective SOC range of the respective batteries according to Examples 1 to 6 relative to their corresponding evaluation batteries versus $\Delta V_{SOC15-95}$ of the corresponding evaluation batteries.
Figure 6:
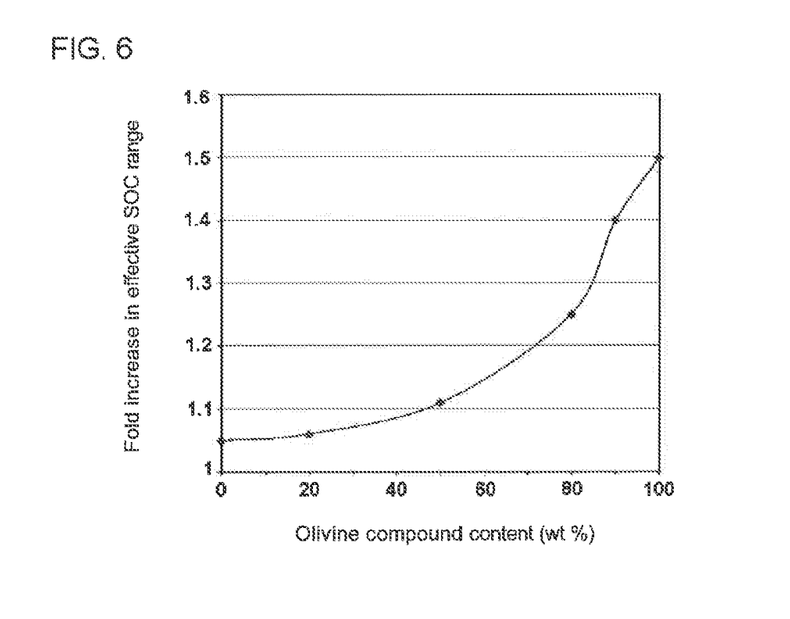
FIG. 6 shows a graph plotting the fold increases in the effective SOC range versus the proportions of an olivine compound contained in the positive electrode active materials.

With respect to each of the batteries of Examples 1 to 12, the relative input power ratio and the relative output power ratio determined as above were plotted against the SOC to determine the effective SOC range where the relative input and output power ratios were 0.85 or above. With respect to the respective batteries of Examples 1 to 6, were determined the fold increases in the effective SOC range relative to the corresponding evaluation batteries of Examples 7 to 12 (e.g., effective SOC range of Example 1/effective SOC range of Example 7), Table 1 shows these results along with the amounts (%) of the olivine compound contained in the positive electrode active materials as well as the $\Delta V_{SOC15\text{-}95}$ values of the evaluation batteries. FIG. 6 shows a plot of the fold increases in the effective SOC range against the amounts (%) of the olivine compound contained in the positive electrode active materials in the respective batteries of Examples 1 to 6. In addition, FIG. 5 shows a plot of these fold increases in the effective SOC range against the $\Delta V_{SOC15\text{-}95}$ values.

[Measurement of Relative Output Power Ratio at 50% SOC]

Figure 7:
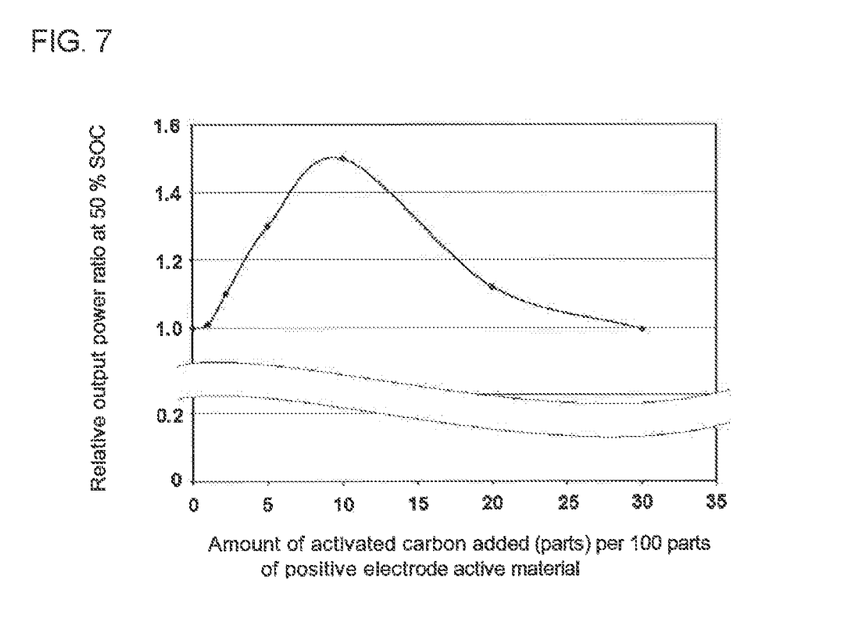
FIG. 7 shows a graph plotting the relative output power ratio at 50% SOC versus the amount of an activated carbon added.

For each of the respective batteries of Examples 13 to 17 with varied amounts of an activated carbon added, the initial SOC was adjusted to 50% and the 5 second output power density was determined in the same manner as described above. With the reference value being the 5 second output power density at 50% SOC of the battery of Example 7, which had been determined above in the measurement of the relative input and output power ratios, relative to this value, was determined the output power ratio at 50% SOC for each battery. Table 2 shows the relative output power ratios at 50% SOC according to the batteries of Examples 1, 7, and 13 to 17 along with the amounts (parts) of the activated carbon added relative to 100 parts of the positive electrode active material. It is noted that with respect to the batteries of Examples 1 and 7, for the relative output power ratios at 50% SOC, were used the values measured above, respectively. FIG. 7 shows a plot of the relative output power ratios at 50% SOC against the amounts (parts) of the activated carbon added.

TABLE 1

| Example | Olivine compound (%) | Corresponding evaluation battery | $\Delta V_{SOC15\text{-}95}$ (V) | Fold increase of effective SOC range |
|---|---|---|---|---|
| 1 | 100 | Example 7 | 0.15 | 1.5 |
| 2 | 90 | Example 8 | 0.21 | 1.4 |
| 3 | 80 | Example 9 | 0.28 | 1.25 |
| 4 | 50 | Example 10 | 0.47 | 1.11 |
| 5 | 20 | Example 11 | 0.65 | 1.06 |
| 6 | 0 | Example 12 | 0.78 | 1.05 |

TABLE 2

| Example | Amount of activated carbon added (parts) | output power ratio at 50% SOC |
|---|---|---|
| 7 | 0 | 1.00 |
| 13 | 1 | 1.01 |
| 1 | 2.2 | 1.10 |
| 14 | 5 | 1.30 |
| 15 | 10 | 1.50 |
| 16 | 20 | 1.12 |
| 17 | 30 | 0.994 |

As shown in table 1 and FIG. 4, the battery of Example 1 with the positive electrode active material containing about 2% of activated carbon exhibited significantly higher input and output power densities at all the SOC values in comparison to the battery of Example 7 which was its corresponding evaluation battery. Along with this, the effective SOC range (SOC range where the relative input and output power ratios were 0.85 or above) increased to 1.5 fold. Especially in a low SOC range, the output property improved significantly.

Also, as shown in Table 1 and FIG. 6, in the batteries of Examples 1 to 4 with the amount of an olivine compound contained in the positive electrode active material being 50% or larger, significant increases in the input and output properties were observed, with the fold increases in the effective SOC range being 1.10 or greater relative to the corresponding evaluation batteries of Examples 7 to 10. On the other hand, in the batteries of Examples 5 and 6 with the olivine compound content being less than 50%, the added activated carbon effected small increases in the input and output properties, with the fold increases in the effective SOC range being less than 1.10 relative to the corresponding evaluation batteries of Examples 11 and 12.

From Table 1 and FIG. 5, the batteries of Examples 1 to 4 with the corresponding evaluation batteries having $\Delta V_{SOC15\text{-}95}$ values of 0.5 V or smaller exhibited fold increases of 1.10 or greater in the effective SOC range thereby showing that the effect of the added activated carbon was significant in batteries in such an embodiment.

In addition, as shown in Table 2 and FIG. 7, in the batteries of Examples 1 and 14 to 16 with 2 to 20 parts of an activated carbon added relative to 100 parts of the positive electrode active material, in comparison to the respective batteries of Examples 7, 13 and 17 with the amount of an activated carbon added being outside of this range, significant effects of increasing the output properties were observed with the relative output power ratios at 50% SOC being 1.10 or greater.

Although specific embodiments of the present invention have been described in detail above, these are merely for illustrations and do not limit the scope of the claims. The art according to the claims includes various modifications and changes of the specific embodiments illustrated above.

REFERENCE SIGNS LIST 1 vehicle (automobile)
20 wound electrode body
30 positive electrode sheet (positive electrode)
32 positive current collector
35 positive electrode material layer
40 negative electrode sheet (negative electrode)
42 negative current collector
45 negative electrode material layer
50 separator
100 lithium-ion secondary battery

The invention claimed is:

1. A lithium-ion secondary battery comprising a positive electrode, a negative electrode, and a non-aqueous liquid electrolyte, wherein
the negative electrode comprises a carbon particle; and
the positive electrode comprises:
as a primary component of its positive electrode active material, a lithium-containing olivine compound represented by general formula:

$LiM^1PO_4$ wherein $M^1$ consists of at least one kind selected from the group consisting of Fe, Co, and Ni, the lithium-containing olivine compound being contained in an amount accounting for 80% by mass or greater of the positive electrode active material; and
5 to 10 parts by mass of an activated carbon relative to 100 parts by mass of the positive electrode active material, the activated carbon having an average particle diameter of 0.1 μm to 50 μm, a specific surface area of 100 m²/g to 2500 m²/g, and a pore volume of 0.2 mL/g to 2.0 mL/g.

2. A vehicle comprising the lithium-ion secondary battery according to claim 1.

3. The lithium-ion secondary battery according to claim 1, wherein the relative output power ratio at 50% SOC (State of Charge) is 1.10 or greater.

4. The lithium-ion secondary battery according to claim 1, wherein the lithium-containing olivine compound is contained in an amount accounting for 100% by mass of the positive electrode active material.

5. The lithium-ion secondary battery according to claim 1, wherein the lithium-containing olivine compound is a compound represented by the general formula:

$LiM^1PO_4$ wherein $M^1$ consists of Fe or Co or a combination of Fe and Co.

6. The lithium-ion secondary battery according to claim 1, wherein the lithium-containing olivine compound is a compound represented by the general formula:

$LiM^1PO_4$ wherein $M^1$ consists of Fe or Ni or a combination of Fe and Ni.

7. The lithium-ion secondary battery according to claim 1, wherein the lithium-containing olivine compound is a compound represented by the general formula:

$LiM^1PO_4$ wherein $M^1$ consists of Co or Ni or a combination of Co and Ni.

8. The lithium-ion secondary battery according to claim 1, wherein the lithium-containing olivine compound is a compound represented by the general formula:

$LiM^1PO_4$ wherein $M^1$ consists of Fe, Co and Ni.

9. The lithium-ion secondary battery according to claim 1, wherein the lithium-containing olivine compound is a compound is at least one selected from the group consisting of $LiFePO_4$, $LiCoPO_4$, $LiNiPO_4$, and $LiFe_xCo_{1-x}PO_4$ wherein $0<x<1$.

10. The lithium-ion secondary battery according to claim 1, wherein the lithium-containing olivine compound is a compound is at least one selected from the group consisting of $LiFePO_4$, $LiNiPO_4$, and $LiFe_xCo_{1-x}PO_4$ wherein $0\leq x<1$.

11. The lithium-ion secondary battery according to claim 1, wherein the lithium-containing olivine compound is $LiFePO_4$.

12. The lithium-ion secondary battery according to claim 1, wherein the lithium-containing olivine compound is $LiCoPO_4$.

13. The lithium-ion secondary battery according to claim 1, wherein the lithium-containing olivine compound is $LiNiPO_4$.

14. The lithium-ion secondary battery according to claim 1, wherein the lithium-containing olivine compound is $LiFe_xCo_{1-x}PO_4$ wherein $0<x<1$.

* * * * *